United States Patent [19]

Gottling

[11] Patent Number: 4,574,924

[45] Date of Patent: Mar. 11, 1986

[54] ROTARY SHAFT SPEED LIMITING ARRANGEMENT

[75] Inventor: Helmut Gottling, Isernhagen, Fed. Rep. of Germany

[73] Assignee: WABCO Westinghouse Steuerungstechnik GmbH, Hanover, Fed. Rep. of Germany

[21] Appl. No.: 593,760

[22] Filed: Mar. 27, 1984

[30] Foreign Application Priority Data

Mar. 28, 1983 [DE] Fed. Rep. of Germany ....... 3311307

[51] Int. Cl.$^4$ .............................................. B60T 13/04
[52] U.S. Cl. ................................... 188/187; 188/170; 92/17
[58] Field of Search ............... 188/187, 182, 180, 170, 188/72.3, 72.4; 92/17, 24, 28, 27; 91/44; 192/91 R, 85 A, 103 F

[56] References Cited

U.S. PATENT DOCUMENTS

| 1,439,827 | 12/1922 | Lockwood | 188/182 |
| 2,843,228 | 7/1958 | Wysor | 188/180 |
| 3,979,999 | 9/1976 | Emenaker | 92/17 |
| 4,424,887 | 1/1984 | Sommer | 188/180 |

Primary Examiner—Duane A. Reger
Assistant Examiner—Alvin Oberley
Attorney, Agent, or Firm—G. E. Hawranko

[57] ABSTRACT

A fluid controlled rotary shaft speed limiting arrangement has a brake disk secured to the shaft for rotational movement therewith. A braking arrangement exerts a braking force on the brake disk according to the amount of fluid pressure present in a brake piston chamber. The flow of pressurized fluid into and the flow of pressurized fluid out of the brake piston chamber is controlled by a valve arrangement, a portion of which is formed on the brake disk. The portion of the valve arrangement formed on the brake disk effects a change in the flow of pressurized fluid through the brake piston chamber if the rotational velocity of the shaft and brake disk varies from a preselected value. Such variation in the rotational velocity corresponds to such change in pressurized fluid flow such that, a proportional braking force is exerted on the brake disk.

18 Claims, 4 Drawing Figures

ROTARY SHAFT SPEED LIMITING ARRANGEMENT

BACKGROUND OF THE INVENTION

This invention relates to an arrangement for limiting the rotary speed of a shaft. Such rotary shafts can be used to meter certain performance characteristics of other machine devices; as for example, where the axial speed of a piston in a double-acting working cylinder, translated to a rotary speed of a shaft, can be regulated by controlling the rotary speed of that shaft. Still other industry applications place critical importance on the rotary speed of the shaft; as for instance, where it is necessary to control and regulate the RPMs of an electric motor. To date, one such approach to regulating the speed of rotary shaft has been to control the RPMs of the electric motor, or to tailor-make some other control to whatever drive device is rotating the rotary shaft. The problems experienced with this indirect rotary shaft speed control arrangement have been: the need to tailor-make a control arrangement depending on the type of drive device; and the inherent delay in effecting a desired speed correction on the rotary shaft, because of the control being on the drive device and not on the rotary shaft. Where a more direct rotary shaft speed limiting arrangement has been attempted, the designs have typically required a large number of components external to the rotary shaft. An example of such an arrangement can be found in German Registered Design No. 82 29 232. This arrangement uses a pressurized brake piston which acts on a brake disk secured to the rotary shaft. Such piston arrangement requires additional external valve means, and the control and adjustment switches associated with that valve means.

SUMMARY OF THE INVENTION

The object of the invention, therefore, is to provide a rotary shaft speed limiting arrangement which can quickly and accurately regulate to the desired rotary shaft speed.

A further object of the invention is to provide such a rotary shaft speed limiting arrangement using a minimum number of components, thereby reducing the manufacture and maintenance costs of such device.

Yet a further object of the invention is to limit the rotary shaft speed directly at the shaft itself, thereby making such limitation independent of the type of rotary drive arrangement, or machine device, which the rotary shaft is being used on.

Briefly, the invention consists of a brake disk secured to a rotary shaft, or a shaft extension, for rotational movement therewith. A brake piston extends outward of a brake piston chamber for contacting the brake disk and thereby limiting the rotational speed of the brake disk and rotary shaft. The force exerted by the brake piston on the brake disk is a function of the fluid pressure present in the brake piston chamber. Such fluid pressure value itself is a function of the amount of fluid pressure supplied from a fluid pressure source through an adjustable flow-control valve, and of the amount of fluid pressure removed from the brake piston chamber by a brake-disk-controlled valve arrangement. In one embodiment of the invention, disk pockets are formed in the brake disk, which align with a valve space in fluid communication with the brake disk chamber. As the brake disk rotates at the desired speed, fluid pressure is removed in an amount replenishable by the setting of the adjustable flow-control valve regulating the fluid pressure supplied to the brake piston chamber. Should the rotary shaft speed up, thereby removing more fluid pressure from the brake piston chamber than is replenished, the brake piston will contact the brake disk, effecting a rotary shaft slowdown. In a second embodiment of the invention, a series of rises and falls are formed around the circumference of the brake disk. As the brake disk rotates, the rises and falls control an operating rod which controls the operation of a 3/2-way valve. The 3/2-way valve is used to charge the brake piston chamber to certain fluid pressure level. An adjustable flow-control valve regulates the amount of fluid pressure exhausted from the brake piston chamber. In this embodiment, a speedup of the rotary shaft results in more fluid pressure supplied to the brake piston chamber, which has the same effect of urging the brake piston against the brake disk and effecting a brake disk slowdown.

DESCRIPTION AND OPERATION

Figure 1:
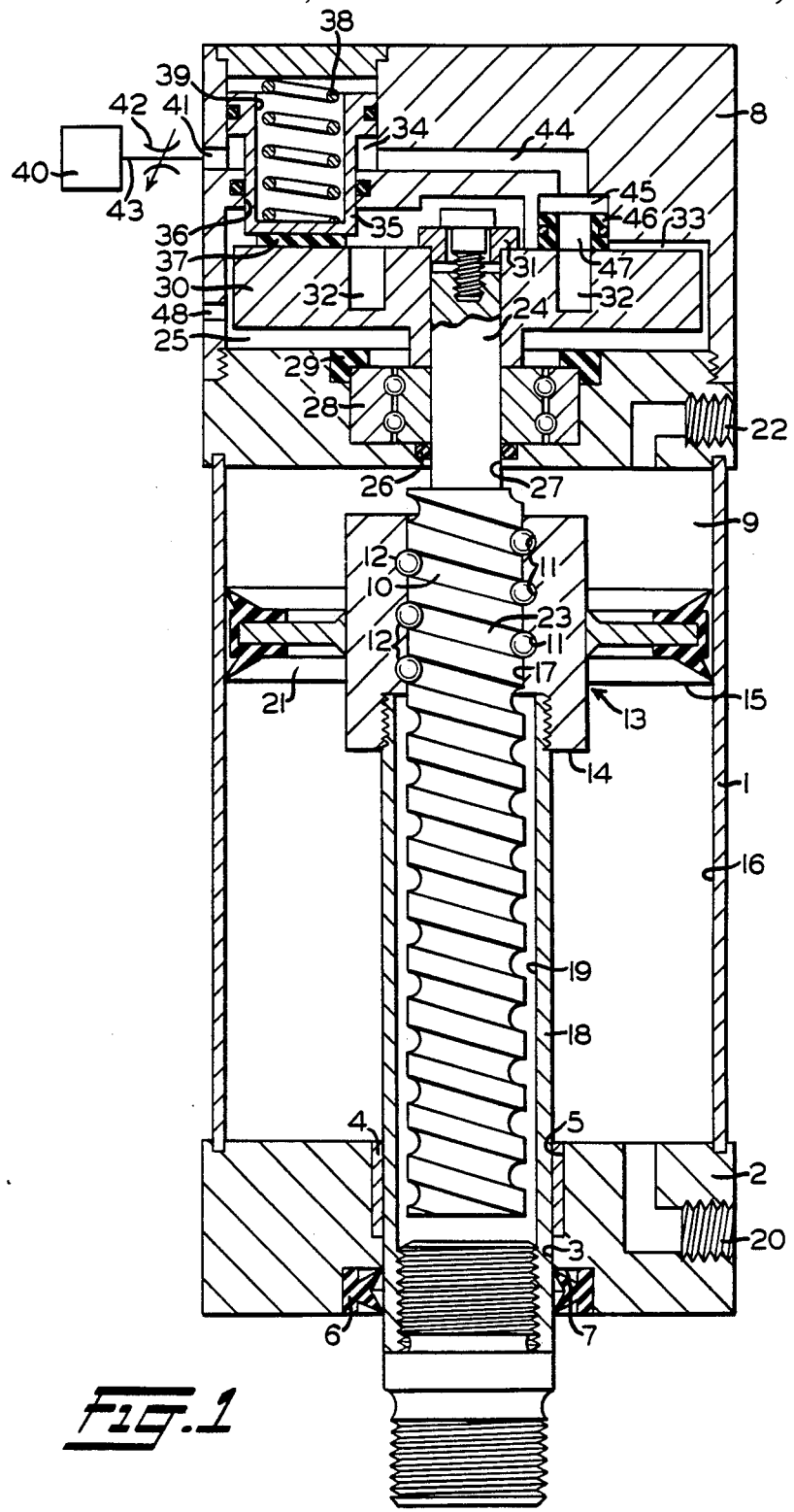
FIG. 1 is a horizontal view, in section, of a working cylinder using the rotary shaft speed limiting arrangement, constructed in accordance with the invention.

As seen in FIG. 1, the rotary shaft speed limiting arrangement, used with a double-acting working cylinder, consists of a cylinder housing 1 having secured at one end thereon a first end portion 2. Formed coaxially within the first end portion 2 is a rod opening 3. A bushing 4 fits within a bushing groove 5, formed about the shaft opening 3, adjacent the cylinder housing 1. A sealing ring 6 fits within an outer recess 7 also formed about the shaft opening 3.

A second end portion 8 is secured to the end of the cylinder housing 1 opposite the first end portion 2, thereby forming piston chamber 9 within the cylinder housing 1. A rotary shaft 10 extends coaxially through at least portion of the piston chamber 9.

A working piston 13 is reciprocally movable within the piston chamber 9. The working piston 13 consists of a inner annular portion 14, and an outer plate portion 15 which is in slidable contact with the inner wall 16 of the piston chamber 9. A graduated recess 17 is formed along a portion of the inner diameter of the inner annular portion 14. A piston rod 18 is fixedly secured within the graduated recess 17 of the inner annular portion 14 such that, the piston rod 18 moves axially with the working piston 13. The piston rod 18 has a hollow core 19, which coaxially surrounds at least a portion of the rotary shaft 10. The piston rod 18 extends through the shaft opening 3. A first pressure opening 20 is formed in the first end portion 2 to allow fluid communication to a first side 21 of the working piston 13. A second pressure opening 22 is formed in the second end portion 8 to allow fluid communication to the side of the working piston 13 opposite the first side 21.

The rotary shaft 10 has formed circumferentially along the length thereof, a fast-pitch thread 23. A plurality of grooves 11 are formed along a portion of the graduated recess 17 of the inner annular portion 14 of the working piston 13. A plurality of guide balls 12 fit within the plurality of grooves 11 and are engageable with the fast-pitch thread 23 of the rotary shaft 10 such that, a ball screw arrangement between the rotary shaft 10 and the working piston 13 is formed. It can be appreciated that as the working piston 13 reciprocally moves within a piston chamber 9 in an axial manner, a rotational movement will be imparted to the rotary shaft 10. It can further be appreciated that the rotary speed of the rotary shaft 10 will be a function of the axial speed of the working piston 13. Such a relationship can be illustrated by way of example: if the piston rod 18 is to move 0.5 meters/second and the rotary shaft 10 has a thread 24 with a pitch of 5 mm, the rotational speed of the rotary shaft 10 will be 6000 RPMs.

Secured to the rotary shaft 10 and extending in a direction away from the working piston 13, is a shaft extension 24. The shaft extension 24 extends into a portion of the second end portion 8, and ends within a disk chamber 25 formed within the second end portion 8. To prevent fluid communication between the piston chamber 9 and the disk chamber 25, a sealing element 26 is disposed about the extension opening 27, through which the shaft extension 24 extends. To allow smooth rotational movement of the shaft extension 24 with the rotary shaft 10, a roller bearing 28 is also disposed in the extension opening 27 in surrounding relation to the shaft extension 24. The roller bearing 28 is secured in the axail direction by a flexible body 29.

Secured to the end of the shaft extension 24, which terminates within the disk chamber 25, is a brake disk 30. The brake disk 30 is fixedly secured to the shaft extension 24 by a screw cap 31. In the preferred embodiment, illustrated in FIG. 1, the brake disk 30, being contained within a disk chamber 25, forms a portion of a valve arrangement used to regulate the rotary shaft speed. A plurality of disk pockets 32 are equidistantly-spaced about the upper surface area 33 of the brake disk 30. In the illustrated brake disk 30, two disk pockets 32 are included; however, a larger number could also be used and still fall within the scope of the invention.

A brake piston chamber 34 is formed in the second end portion 8 adjacent the disk chamber 25. A brake piston 35 is operably-disposed within the brake piston chamber 34 such that, the brake piston 35 can extend through a brake piston opening 36 and into the disk chamber 25. A brake pad 37 is secured to the end of the brake piston 35 that extends into the disk chamber 25. A piston bias spring 38 is disposed in a spring pocket 39 formed in a brake piston 35. The piston bias spring 38 urges the brake piston 35 in a direction toward the brake disk 30.

Fluid pressure from a fluid pressure source 40 is introduced through a third pressure inlet 41 formed in the second end portion 8. An adjustable flow-control valve 42 is disposed in the fluid pressure line 43 leading from the fluid pressure source 40 to the third pressure inlet 41.

A passageway 44 extends from the brake piston chamber 34 to a valve space 45 also formed in the second end portion 8 adjacent the disk chamber 26. Valve disk 46 is disposed in the valve space 45. Valve disk 46 has a valve opening 47 corresponding in size to the open area of the disk pockets 32 formed in the brake disk 30.

As shown, the disk pocket 32 aligns with the valve opening 47 such that, the disk pocket 32 is in with the brake piston chamber 34. It can be appreciated that the valve disk 46 can be replaced with another valve disk having a smaller cross-sectional area. This would provide a kind of adjustment between the valve disk 46 and the disk pocket 33, which would have the effect of varying the fluid pressure that could be transferred from the valve space 45 to the disk pocket 33 during the rotational movement of the brake disk 30. Also, in this manner, it can be seen that as each disk pocket 32 aligns with the valve space 46, an amount of fluid pressure is removed from the valve space 45 which, because the valve space 45 is in fluid communication with the brake piston chamber 34, has the effect of removing that fluid pressure from the brake piston chamber 34. As the brake disk 30 rotates away from the valve opening 47 and toward the disk chamber 25, the fluid pressure is effectively scooped out of the brake piston chamber 34 and dumped into the disk chamber 25 which, having an exhaust outlet 48, vents that fluid pressure to atmosphere.

The adjustable flow-control valve 42 can be preset to allow sufficient fluid pressure into the brake piston chamber 34, as has been removed during the rotation of the brake disk 30, which has effected a fluid pressure dumping from the brake piston chamber 34. If, for some reason, the rotary speed of the rotary shaft 10 has increased, the brake disk 30 will remove more fluid pressure from the brake piston chamber 34 than is being replenished from the fluid pressure source 40. In this event, fluid pressure in the brake piston chamber 34 will decrease, thereby allowing the brake piston to be urged in a direction towards the brake disk. In this manner, any changes in the rotational speed of the rotary shaft 10 can be compensated for quickly and accurately.

In operation, the rotary shaft speed limiting arrangement, shown in FIG. 1, is used with a double-acting working cylinder which operates in a typical working cylinder manner by pressurizing one of two pressure inlets 20, 22, thus urging a working piston 13 in an axial direction. A ball screw arrangement between the working piston 13 and a rotary shaft 10 which extends coaxially through the working piston 13, translates the axial movement of the working piston 13 into a rotational movement of the rotary shaft 10.

Simultaneous to pressurizing one side of the working piston 13, fluid pressure is supplied to the brake piston chamber 34 from a separate fluid pressure source 40. The adjustable flow-control valve 42, disposed in the fluid pressure line 43, between the fluid pressure source 40 and third fluid pressure inlet 41, can be preset to a desired setting according to a fluid pressure relationship which will be described hereinafter in further detail.

The fluid pressure present in the brake piston chamber 34 urges the brake piston 35 in a direction away from the brake disk 30, thus compressing the piston bias spring 38. By way of the passageway 44, the fluid pressure value present in the brake piston chamber 34 will also be present at the valve space 45. As seen in FIG. 1, the valve space 45 is reduced in cross-sectional area by the use of a valve disk 46. In this instance, the valve disk 46 is sized to present a valve opening 47, which is substantially equal in cross-sectional area to the opening of the disk pockets 32. As further seen in FIG. 1, the valve opening 47 is in communication with the disk chamber 25.

As the brake disk 30 rotates within the disk chamber 25, a portion of the brake disk 30 will come in sliding contact with the flexible valve disk 46 such that, one of the disk pockets 32 will align in a sealing manner with the valve opening 47. With each revolution of the brake disk 30, the disk pocket 32, which aligns with the valve opening 47, will remove an amount of fluid pressure from the valve space 45 equivalent to the volume of the disk pocket 32. Since the valve space 45 is in fluid communication with the brake piston chamber 34, the scooping method of removing fluid pressure with the disk pocket 32 has the effect of decreasing the fluid pressure in the brake piston chamber 34. As the brake disk 30 continues the revolution, the filled disk pocket 32 will dump the removed fluid pressure into the disk chamber 25 which, by way of exhaust opening 48, is vented to atmosphere.

Absent a replenishing of this removed fluid pressure from the brake piston chamber 34, the brake piston 35 would be urged into contact with the brake disk 30 by the piston bias spring 38. Such brake disk 30, brake piston 34 contact is, however, only intended to occur should the rotary shaft speed deviate from the desired setting. Therefore, it becomes necessary to replenish the fluid pressure in the brake piston chamber 34 in the amount equivalent to that removed by the disk pockets 32. For this purpose, the adjustable flow-control valve 42 can be preset to regulate the fluid pressure supplied to the brake piston chamber 34 to the desired value.

If the axial speed of the working piston 13 would increase for some reason, and thereby result in an increase in the rotary speed of the rotary shaft 10, brake disk 30 structure, more fluid pressure would be removed from the brake piston chamber 34 than could be replenished over the setting of the adjustable flow-control valve 42. The brake piston 35 would then be urged in a direction toward the brake disk 30 under the influence of the piston bias spring 38. The brake pad 37 will then contact the brake disk 30, effecting a slowdown in the rotary shaft speed; and, consequently, a reduction in the axial speed of the working piston 13.

Figure 2:
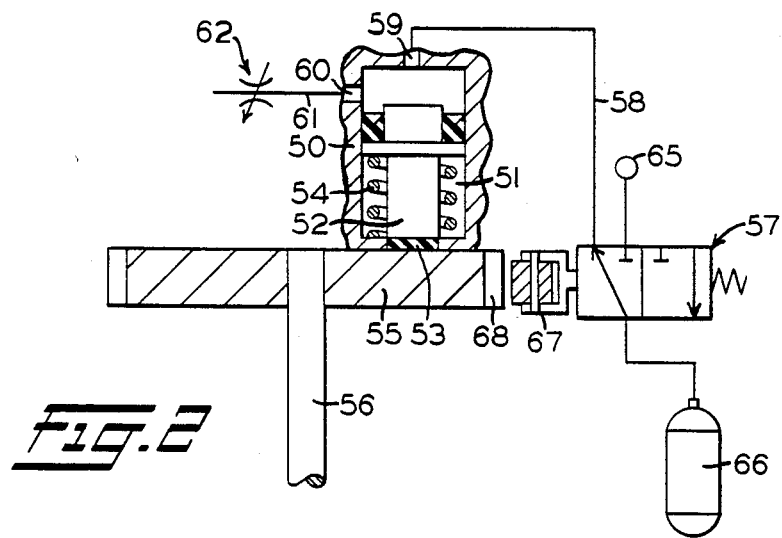
FIG. 2 is a horizontal view, partly in section, of an alternate rotary shaft speed limiting arrangement, constructed according to the invention.

Referring now to FIG. 2, it can be seen that the rotary shaft speed limiting arrangement can be installed external to the actual device which drives the rotary shaft.

A brake piston housing 50 contains a brake piston chamber 51, whereby a brake piston 52 and brake pad 53 are reciprocally movable therein. A piston bias spring 54 is disposed within the brake piston housing 50 for urging the brake piston 52 in a direction away from a brake disk 55. Brake disk 55 is rigidly-connected to a rotary shaft 56 and movable therewith.

Brake piston chamber 51 is connected with a 3/2-way valve 57 over a pressure supply line 58, which connects to a pressure opening 59 formed in the brake piston housing 50. A pressure exhaust opening 60 is also formed in a brake piston housing 50. Connected to the pressure exhaust opening 60 is an exhaust line 61 and an adjustable flow-control valve 62. The 3/2-way valve 57 has an operating rod 67, which is activated by a control curve 68 formed on the circumference of the brake disk 55.

A fluid pressure source 65 supplies fluid pressure to an input of the 3/2-way valve 57 which, when the 3/2-way valve 57 is in a first position, as shown in FIG. 2, is fed to a fluid pressure reservoir 66. The operating rod 67 contacts the brake disk 55 such that, rotational movement of the brake disk 55 causes the operating rod 67 to move the 3/2-way valve 57 alternately between the first position, as shown in FIG. 2, and a second position; whereby the fluid pressure fed into the reservoir 66 is fed over a fluid supply line 58 to the brake piston chamber 51.

Figure 3:
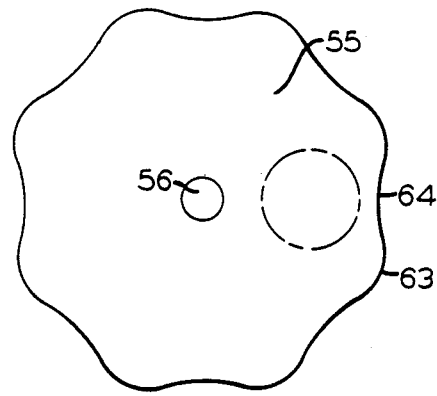
FIG. 3 is a sectional view of a brake disk, taken along lines I—I of FIG. 2.

As seen in FIG. 3, the brake disk 55 has formed symmetrically around the outer circumference, a series of rises 63 and valleys 64, which together constitute a control curve 68 which controls the operating rod 67.

The operation of driving the rotary shaft 56 will not again be detailed, inasmuch as a general operation has been describe in regard to the rotary shaft speed limiting arrangement embodied in FIG. 1. The general operating features of the rotary shaft speed limiting arrangements embodied in FIGS. 1 and 2 is the same in that, fluid pressure into and out of a brake piston chamber is the function of a valve arrangement which is controlled by the speed of the rotary shaft, brake disk structure. By operating a brake piston as a function of the fluid pressure level present in the brake piston chamber, which brake piston is engageable with the brake disk, a handshake arrangement between the rotary shaft speed and the brake piston chamber fluid pressure value is established.

As the brake disk 55 rotates at the desired speed, the control curve 68 urges the operating rod 67 to alternate first and second positions, corresponding to first and second positions of the 3/2-way valve 57. In the first position, as shown in FIG. 2, fluid pressure from the fluid pressure source 65 is fed to a reservoir 66. This first valve position corresponds to the rise portion 63 of the control curve 68 contacting the operating rod 67.

As the brake disk 55 continues to rotate, the rise portion 63 of the control curve 68 moves out of contact with the operating rod 67. The operating rod 67 then follows the valley portion 64 of the control curve 68, thus allowing the 3/2-way valve 57 to move into the second valve position. In the second valve position, the fluid connection between the fluid pressure source 59 and the reservoir 66 is cut off, and a second fluid connection between the reservoir and brake piston chamber 51 is established over fluid supply line 58. In this manner, the brake piston chamber 51 is systematically pressurized as a function of the rotational speed of the brake disk 55, rotary shaft 56 structure. Absent a systematic venting of fluid pressure from the brake piston chamber 51, the brake piston 52 would be urged toward the brake disk 55, effecting a slowdown of the rotary shaft 56 speed. Since such brake piston 52, brake disk 55 contact is only intended to occur when the rotary shaft 56 deviates from the desired speed, a method of exhausting fluid pressure from the brake piston chamber 51 is needed. For this purpose, an adjustable flow-control valve 62 is included in the exhaust line 61 and set such that, an amount of fluid pressure equivalent to that being supplied due to the alternating operation of the 3/2-way valve 57, is vented from the brake piston chamber 51.

If the rotary shaft 56 speed should increase for some reason, more fluid pressure would be supplied to the brake piston chamber 51 than could be vented over the exhaust line 61, adjustable flow-control valve 62 arrangement. The brake piston 52 would then be urged in a direction toward the brake disk 55, effecting a rotary shaft 56 speed reduction. It should be noted that such aforementioned handshake operation provides for correction of speed deviations in both directions. I the RPMs of the rotary shaft 56 should drop below the desired RPM value, more fluid pressure will be vented from the brake piston chamber than is being supplied over the pressure supply line 58.

Though the above discussion has presented a rotary shaft speed limiting arrangement in two embodiments, other alternatives for practicing the invention are contemplated herein as well. For example, additional brake pistons could be disposed relative to the brake disk, or the brake piston could be disposed to act on the brake disk in a radially directed manner.

Figure 4:
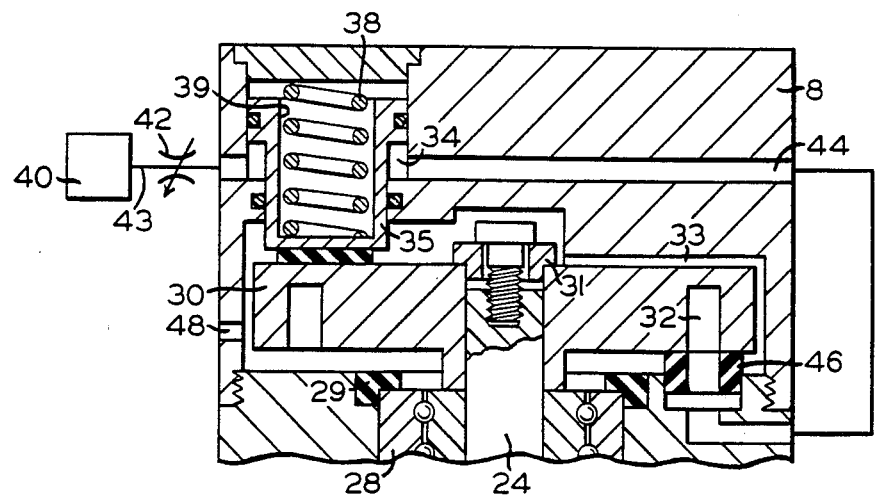
FIG. 4 is a horizontal view, in section, of a rotary shaft speed limiting arrangement constructed in accordance with an alternate embodiment of the invention.

As a further example, the disk pockets 32 could be disposed on the underside of the brake disk 30 as shown in FIG. 4 thereby providing a counterbalancing effect between the fluid pressure removed from the brake piston chamber 34 and the braking force of the brake piston 35.

I claim:

1. A fluid controlled arrangement for limiting the rotary speed of a shaft comprising:
   (a) a brake disk fixedly secured to such shaft for rotational movement therewith;
   (b) a brake piston housing disposed adjacent said brake disk;
   (c) braking means partially disposed in said brake piston housing and extendable therefrom for frictionally contacting said brake disk and exerting a force to retard the rotational velocity of said brake disk;
   (d) pressurizing means for controlling a flow of pressurized fluid into and a flow of pressurized fluid out of said brake piston housing, such pressurized fluid in said brake piston housing acting on said braking means; and
   (e) said pressurizing means having an actuating means partially formed on said brake disk for varying one of such flows of pressurized fluid to control the fluid pressure in said brake piston housing, said actuating means including an exhaust valve partially formed on said brake disk and partially formed in said brake piston housing, said exhaust valve having at least one disk pocket formed on said brake disk and in communication with said braking means, said braking means exerts such force to retard the rotational velocity of said brake disk, such braking means force being a function of the difference between a present shaft rotational velocity and a preselected shaft rotational velocity.

2. A fluid controlled rotary shaft speed limiting arrangement, as set forth in claim 1, wherein said pressurizing means further includes an adjustable metering means for setting one of such flows of pressurized fluid to a preselected value corresponding to such preselected shaft rotational velocity.

3. A fluid controlled rotary shaft speed limiting arrangement, as set forth in claim 1, wherein said braking means includes a brake piston reciprocally movable in said brake piston housing; a frictionally surfaced pad secured to said brake piston for contacting said brake disk; and a spring member acting on said brake piston for exerting a spring force in opposition to the force exerted by said fluid pressure in said brake piston housing.

4. A fluid controlled rotary shaft speed limiting arrangement, as set forth in claim 1, wherein said pressurizing means further includes an adjustable metering means for setting such flow of pressurized fluid into said brake piston housing to a preselected value corresponding to such preselected shaft rotational velocity.

5. A fluid controlled rotary shaft speed limiting arrangement, as set forth in claim 4 wherein said braking means includes a brake piston reciprocally movable in said brake piston housing, frictionally surfaced pad secured to said brake piston for contacting said brake disk; and a spring member acting on said brake piston for exerting a spring force in opposition to the force exerted by said fluid pressure in said brake piston housing.

6. A fluid controlled rotary shaft speed limiting arrangement, as set forth in claim 3, wherein said exhaust valve further includes one of a plurality of annular rings having one of a plurality of valve opening areas, said annular ring being selectable according to said valve opening area and being disposed in said brake piston housing such that said valve opening area and said at least one disk pocket align as said brake disk rotates, such volumetric flow of pressurized fluid out of said brake piston housing being a function of said valve opening area of said selected annular ring.

7. A fluid controlled rotary shaft speed limiting arrangement, as set forth in claim 6, wherein said braking means contacts said brake disk and exerts such force on a first side of said brake disk in a direction perpendicular to the longitudinal axis of said brake disk.

8. A fluid controlled rotary shaft speed limiting arrangement, as set forth in claim 7, wherein said at least one disk pocket is formed on said first side of said brake disk radially outward from where said braking means contacts said brake disk.

9. A fluid controlled rotary shaft speed limiting arrangement, as set forth in claim 1, wherein said exhaust valve further includes one of a plurality of annular rings having one of a plurality of valve opening areas, said annular ring being selectable according to said valve opening area and being disposed in said brake piston housing such that said valve opening area and said at least one disk pocket align as said brake disk rotates, such volumetric flow of pressurized fluid out of said brake piston housing being a function of said valve opening area of said selected annular ring.

10. A fluid controlled rotary shaft speed limiting arrangement, as set forth in claim 1, wherein said braking means contacts said brake disk and exerts such force on a first side of said brake disk in a direction perpendicular to the longitudinal axis of said brake disk.

11. A fluid controlled rotary shaft speed limiting arrangement, as set forth in claim 10, wherein said at least one disk pocket is formed on said first side of said brake disk radially inward from where said braking means contacts said brake disk.

12. A fluid controlled rotary shaft speed limiting arrangement, as set forth in claim 10, wherein said at least one disk pocket is formed on a second side of said brake disk opposite said first side on which said braking means contacts said brake disk.

13. A fluid controlled rotary shaft speed limiting arrangement, as set forth in claim 1, wherein said exhaust valve includes a plurality of disk pockets formed on said brake disk.

14. A fluid controlled rotary shaft speed limiting arrangement, as set forth in claim 1, wherein said pressurizing means further includes an exhaust chamber disposed in surrounding relation to a portion of said brake disk such that said at least one disk pocket communicates such volumetric flow of pressurized fluid flowing out of said brake piston housing to said exhaust chamber.

15. A fluid controlled arrangement for limiting the rotary speed of a shaft comprising:

(a) a brake disk fixedly secured to such shaft for rotational movement therewith;

(b) a brake piston housing disposed adjacent said brake disk;

(c) braking means partially disposed in said brake piston housing and extendable therefrom for frictionally contacting said brake disk and exerting a force to retard the rotational velocity of said brake disk;

(d) pressurizing means for controlling a flow of pressurized fluid into and a flow of pressurized fluid out of said brake piston housing, such pressurized fluid in said brake piston housing acting on said braking means; and (e) said pressurizing means having an actuating means partially formed on said brake disk for varying one of such flows of pressurized fluid to control the fluid pressure in said brake piston housing, said actuating means includes a lobed surface formed on said brake disk; an operating rod in contact with said lobed surface, and a two-position directional valve connected to said operating rod such that, rotation of said brake disk effects operation of said directional valve alternately to one of said two positions, said braking means exerts such force to retard the rotational velocity of said brake disk, such braking means force being a function of the difference between a present shaft rotational velocity and a preselected shaft rotational velocity.

16. A fluid controlled rotary shaft speed limiting arrangement, as set forth in claim 15, wherein said pressurizing means further includes an adjustable metering means for setting such flow of pressurized fluid out of said brake piston housing to a preselected value corresponding to such preselected shaft rotational velocity.

17. A fluid controlled rotary shaft speed limiting arrangement, as set forth in claim 16, wherein said braking means includes a brake piston reciprocally movable in said brake piston housing; a frictionally surfaced pad secured to said brake piston for contacting said brake disk; and a spring member acting on said brake piston for exerting a spring force in opposition to the force exerted by said fluid pressure in said brake piston housing.

18. A fluid controlled rotary shaft speed limiting arrangement, as set forth in claim 15, wherein said lobed surface of said brake disk has a plurality of lobes formed thereon.

* * * * *

UNITED STATES PATENT AND TRADEMARK OFFICE
CERTIFICATE OF CORRECTION

PATENT NO. : 4,574,924

DATED : March 11, 1986

INVENTOR(S) : Helmut Gottling

It is certified that error appears in the above-identified patent and that said Letters Patent are hereby corrected as shown below:

Column 8, line 11, delete "3" and insert --5--

Signed and Sealed this

Eighth Day of July 1986

[SEAL]

Attest:

Attesting Officer

DONALD J. QUIGG

Commissioner of Patents and Trademarks